(12) United States Patent
Emilianowicz

(10) Patent No.: US 8,312,627 B2
(45) Date of Patent: Nov. 20, 2012

(54) METHODS FOR REPAIRING COMBUSTOR LINERS

(75) Inventor: Edward John Emilianowicz, West Chester, OH (US)

(73) Assignee: General Electric Company, Schenectady, NY (US)

( * ) Notice: Subject to any disclaimer, the term of this patent is extended or adjusted under 35 U.S.C. 154(b) by 513 days.

(21) Appl. No.: 11/644,614

(22) Filed: Dec. 22, 2006

(65) Prior Publication Data

US 2008/0172876 A1 Jul. 24, 2008

(51) Int. Cl.
*B23P 6/00* (2006.01)

(52) U.S. Cl. .................. 29/889.1; 29/402.03; 29/402.08; 29/458

(58) Field of Classification Search .................. 29/889.1, 29/402.01, 700, 703, 729, 709, 771, 428, 29/402.1, 458, 460, 402.03, 402.08, 889.2
See application file for complete search history.

(56) References Cited

U.S. PATENT DOCUMENTS

| | | | |
|---|---|---|---|
| 4,827,588 A | 5/1989 | Meyer | |
| 5,658,614 A | 8/1997 | Basta et al. | |
| 6,289,585 B1 * | 9/2001 | Staruszkiewicz | 29/890.052 |
| 6,345,441 B1 | 2/2002 | Farmer et al. | |
| 6,568,079 B2 | 5/2003 | Farmer et al. | |
| 6,581,285 B2 | 6/2003 | Emilianowicz | |
| 6,782,620 B2 | 8/2004 | Caldwell et al. | |
| 6,904,676 B2 * | 6/2005 | Emilianowicz | 29/890.01 |
| 6,986,201 B2 | 1/2006 | Moertle et al. | |
| 7,086,232 B2 | 8/2006 | Moertle et al. | |
| 7,192,622 B2 * | 3/2007 | Fernihough et al. | 427/157 |
| 7,662,435 B2 | 2/2010 | Chelappa et al. | |
| 2004/0107574 A1 | 6/2004 | Moertle et al. | |
| 2005/0050896 A1 | 3/2005 | McMasters | |
| 2005/0262690 A1 * | 12/2005 | Swaffar | 29/889.1 |
| 2006/0021219 A1 * | 2/2006 | Caldwell et al. | 29/889.1 |
| 2008/0148565 A1 | 6/2008 | Emilianowicz | |
| 2009/0038935 A1 | 2/2009 | Floyd et al. | |
| 2010/0031664 A1 | 2/2010 | Emilianowicz | |

* cited by examiner

*Primary Examiner* — David Bryant
*Assistant Examiner* — Christopher Besler
(74) *Attorney, Agent, or Firm* — David J. Clement; Trego, Hines & Ladenheim, PLLC

(57) ABSTRACT

A method for repairing a combustor liner for a gas turbine engine combustor, the combustor having a combustion zone formed by inner and outer liners, the method comprising the steps of removing a portion of a combustor liner to form a deficit in the liner; providing a replacement panel having at least one opening and a thermal barrier material applied to the replacement panel adjacent to the opening, and installing the replacement panel in the deficit.

6 Claims, 6 Drawing Sheets

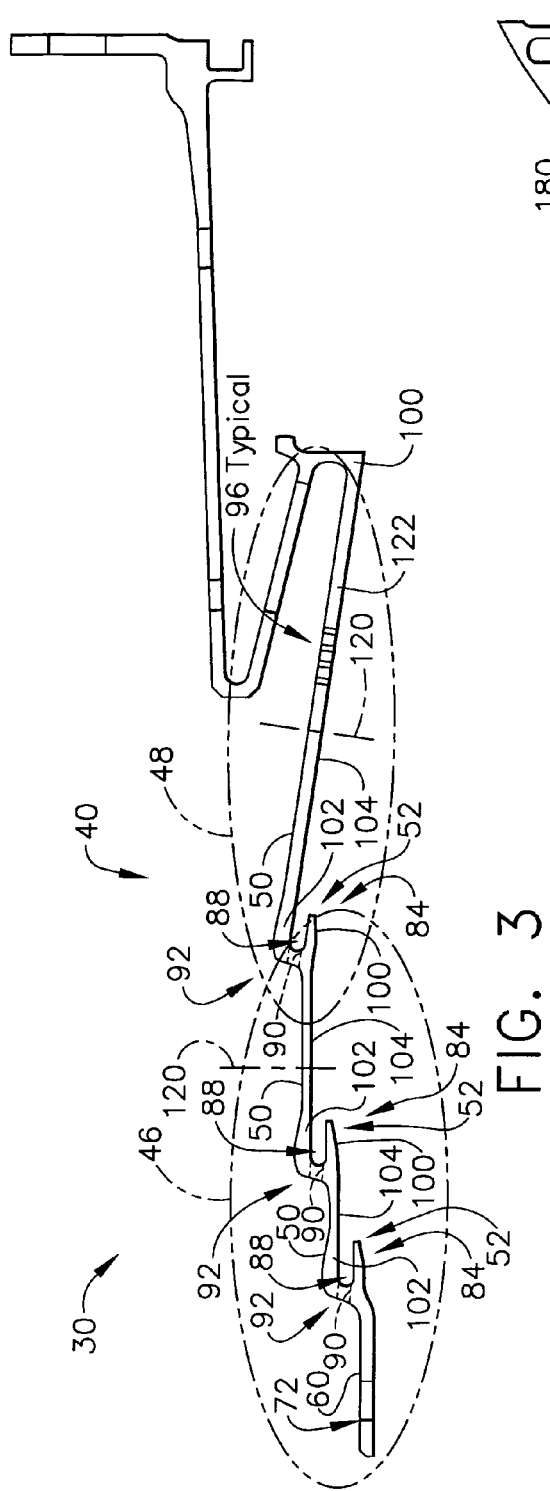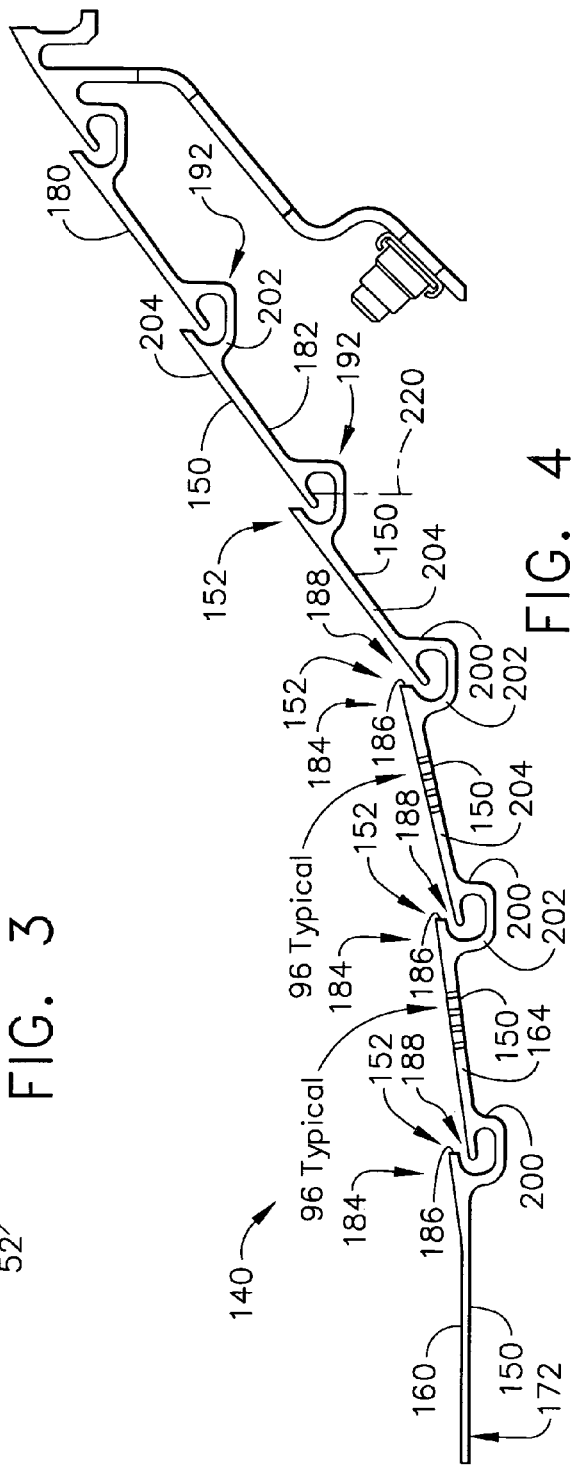

METHODS FOR REPAIRING COMBUSTOR LINERS

BACKGROUND OF THE INVENTION

The technology described herein relates generally to gas turbine engines, and more particularly, to methods for repairing combustor liners used with gas turbine engines.

A gas turbine engine includes a compressor for compressing air which is mixed with a fuel and channeled to a combustor wherein the mixture is ignited within a combustion chamber for generating hot combustion gases. At least some known combustors include a dome assembly, a cowling, and liners to channel the combustion gases to a turbine, which extracts energy from the combustion gases for powering the compressor, as well as producing useful work to propel an aircraft in flight or to power a load, such as an electrical generator. The liners are coupled to the dome assembly with the cowling, and extend downstream from the cowling to define the combustion chamber.

At least some known liners include a plurality of panels that are connected together with riveted, bolted, or welded connections. A portion of the panels include cooling nuggets formed between adjacent panels that extend radially outwardly from the panels and away from the combustion chamber. Accordingly, such cooling nuggets are not subjected to the same degree of heat as portions of the panels adjacent the combustion chamber, and as such, during operation thermal stresses may be induced within the panels. Over time, continued operation with thermal stresses may cause panels to thermally fatigue, causing weakening and/or cracking to develop within the panels.

Current repair methods include welding thermal fatigue cracks. Additionally, patches may be attached to areas of panels that are weakened by thermal stresses. However, if the thermal stresses have induced thermal fatigue or distress in larger areas of the panels or in a plurality of panels, the combustor may not have enough structural integrity within such panels to enable patches to be attached. The location of openings in the panels, such as cooling or dilution holes, and the use of thermal barrier coatings add additional complexity to the use of welds and patches. In such cases, repair of such panels is not a feasible option, and instead the entire combustor liner is replaced.

Because the liner is coupled to the cowl and the dome assembly, often the entire combustor must be disassembled for the liner to be replaced. Furthermore, when the fasteners are removed from the cowl and dome assembly, precise dimensional relations between the components may be altered and as a result, special tooling may be required during re-assembly. Thus, replacing a combustor liner including cooling nuggets may be a time-consuming and expensive process.

BRIEF SUMMARY OF THE INVENTION

A method for repairing a combustor liner for a gas turbine engine combustor, the combustor having a combustion zone formed by inner and outer liners, the method comprising the steps of removing a portion of a combustor liner to form a deficit in the liner; providing a replacement panel having at least one opening and a thermal barrier material applied to the replacement panel adjacent to the opening, and installing the replacement panel in the deficit.

BRIEF DESCRIPTION OF THE DRAWINGS

The accompanying drawings illustrate several embodiments of the technology described herein, wherein:

FIG. 3 is an enlarged cross-sectional view of an outer combustor liner used with the combustor shown in FIG. 2;

FIG. 4 is an enlarged cross-sectional view of an alternative version of an inner combustor liner used with the combustor shown in FIG. 2;

DETAILED DESCRIPTION OF THE INVENTION

Figure 1:
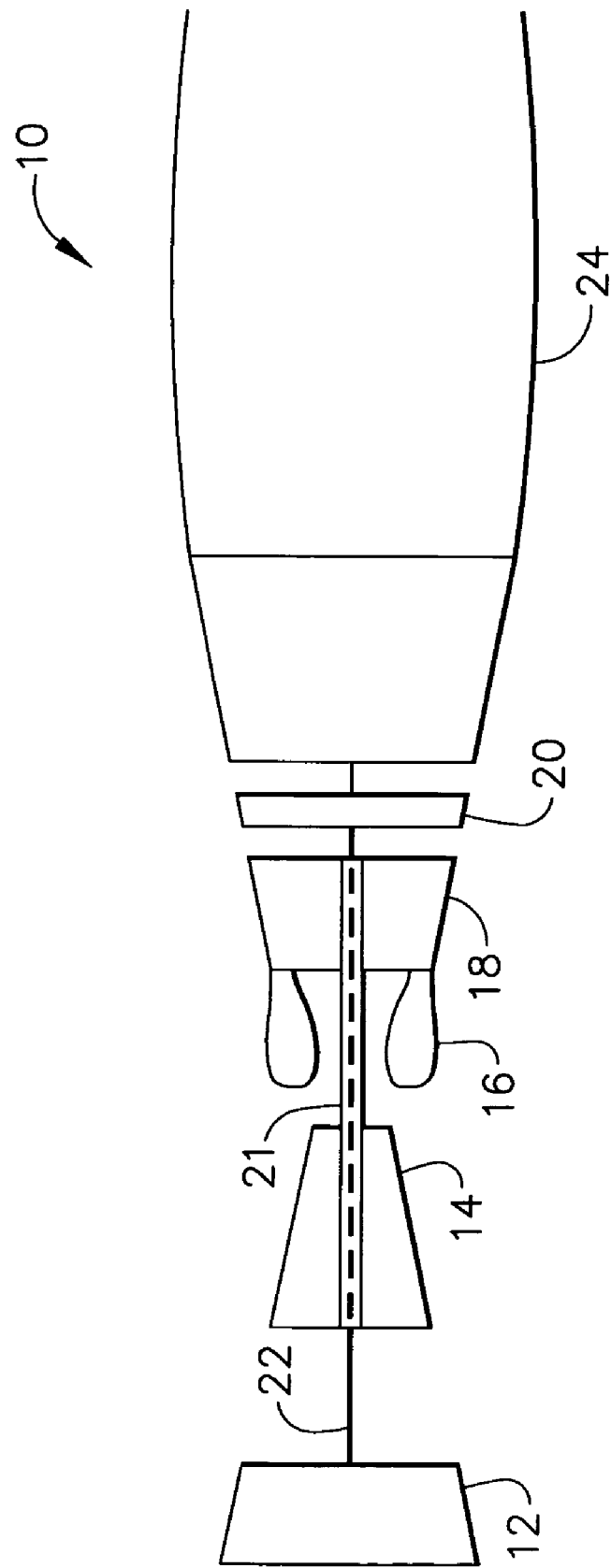
FIG. 1 is schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 22, and compressor 14 and turbine 18 are coupled by a second shaft 21. In one embodiment, gas turbine engine 10 is a GE90 engine commercially available from General Electric Aircraft Engines, Cincinnati, Ohio. In another embodiment, gas turbine engine 10 is a CF engine commercially available from General Electric Aircraft Engines, Cincinnati, Ohio.

In operation, air flows through low pressure compressor 12 and compressed air is supplied from low pressure compressor 12 to high pressure compressor 14. The highly compressed air is delivered to combustor 16. Airflow from combustor 16 drives turbines 18 and 20 and exits gas turbine engine 10 through a nozzle 24.

Figure 2:
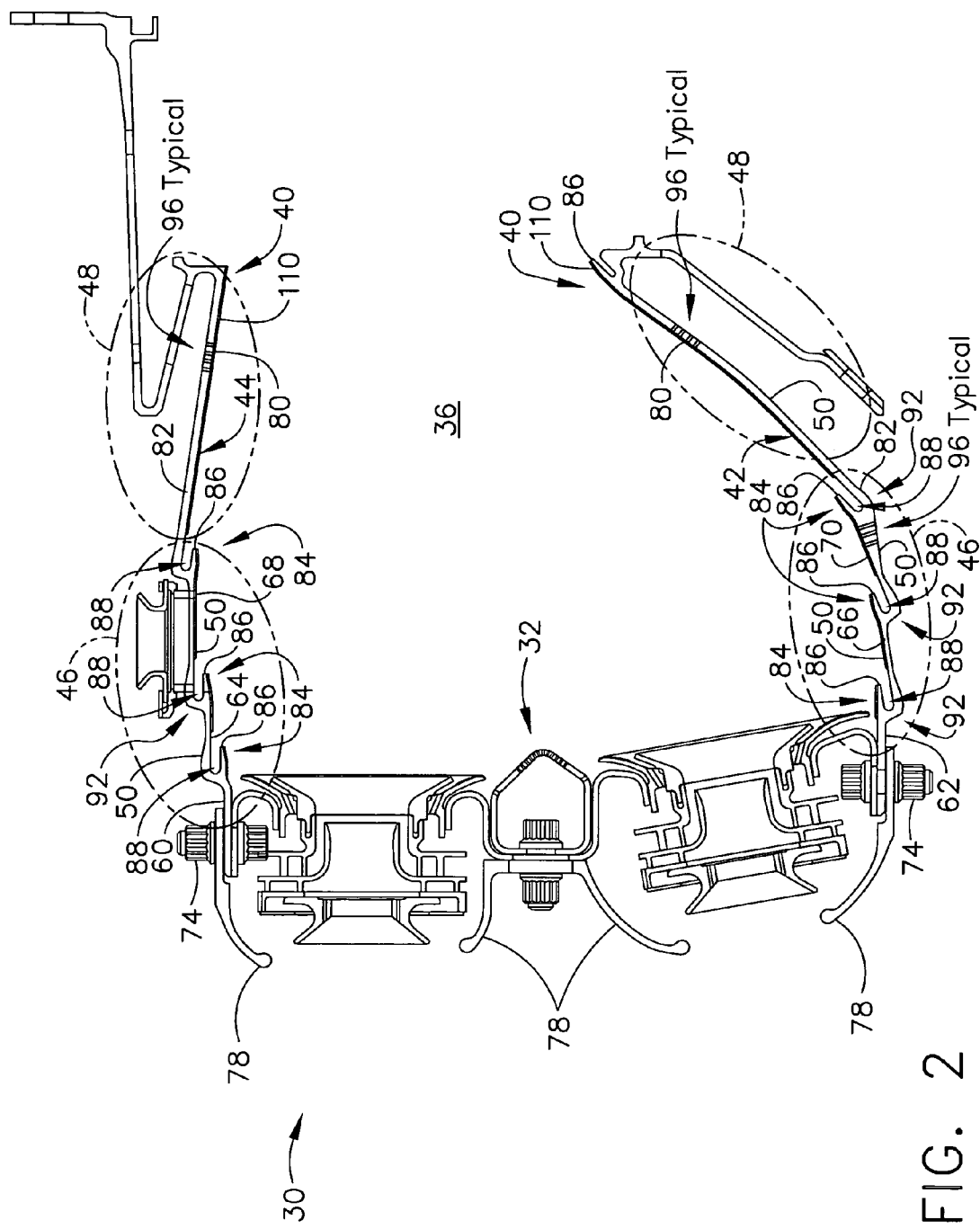
FIG. 2 is a partial cross-sectional view of a combustor assembly that may be used with the gas turbine engine shown in FIG. 1.

FIG. 2 is a partial cross-sectional view of a combustor 30. FIGS. 3 and 4 are enlarged views of portions of combustor 30. Combustor 30 may be used with gas turbine engine 10 shown in FIG. 1, and includes a dome assembly 32. A fuel injector (not shown) extends into dome assembly 32 and injects atomized fuel through dome assembly 32 into a combustion zone 36 of combustor 30 to form an air-fuel mixture that is ignited downstream of the fuel injector.

Combustion zone 36 is formed by annular, radially outer and radially inner supporting members (not shown) and combustor liners 40. Combustor liners 40 shield the outer and inner supporting members from the heat generated within combustion zone 36 and include an inner liner 42 and an outer liner 44. Each liner 42 and 44 is annular and includes a multinugget region 46 and a multihole region 48. Each multinugget region 46 extends from dome assembly 32 downstream to each multihole region 48.

Liners 42 and 44 define combustion zone 36. Combustion zone 36 extends from dome assembly 32 downstream to a turbine nozzle (not shown). Outer and inner liners 44 and 42 each include a plurality of panels 50 which include a series of steps 52, each of which form a distinct portion of combustor liner 40.

Outer liner 44 and inner liner 42 each include a bolt band 60 and 62, respectively, and a first panel 64 and 66, respectively. Outer bolt band 60 and inner bolt band 62 are positioned adjacent to dome assembly 32 and extend downstream from dome assembly 32 to first panels 64 and 66, respectively. First panels 64 and 66 are connected downstream from bolt bands 60 and 62, respectively. Each adjacent downstream panel 50 is numbered sequentially, such that second panels 68 and 70 are connected downstream from respective first panels 64 and 66. Bolt bands 60 and 62 include a plurality of openings 72 sized to receive fasteners 74 therethrough. Fasteners 74 secure liners 42 and 44, bolt bands 60 and 62, and a cowl assembly 78 to dome assembly 32.

Each combustor panel 50 includes a combustor liner surface 80, an exterior surface 82, and an overhang portion 84. Combustor liner surface 80 extends from dome assembly 32 to the turbine nozzle. Combustor liner surface 80 and exterior surface 82 are connected together at overhang portion 84 and form a rear facing edge 86. A plurality of air cooling features 88 separate adjacent combustor panels 50.

Air cooling features 88 include openings 90 which receive air therethrough from an air plenum (not shown) such that a thin protective boundary of air is formed between high temperature combustion gases and combustor liner surface 80. Furthermore, openings 90 permit convective cooling of combustor liner 40. Specifically, openings 90 extend through features 88 which are formed between adjacent panels 50 and radially inward from nuggets 92 formed by panels 50. Panels 50 are connected serially, such that each panel downstream end 100 is connected to an upstream end 102 of an adjacent downstream panel 50. Nuggets 92 are formed between adjacent connected panels respective downstream and upstream ends 100 and 102.

Figure 5:
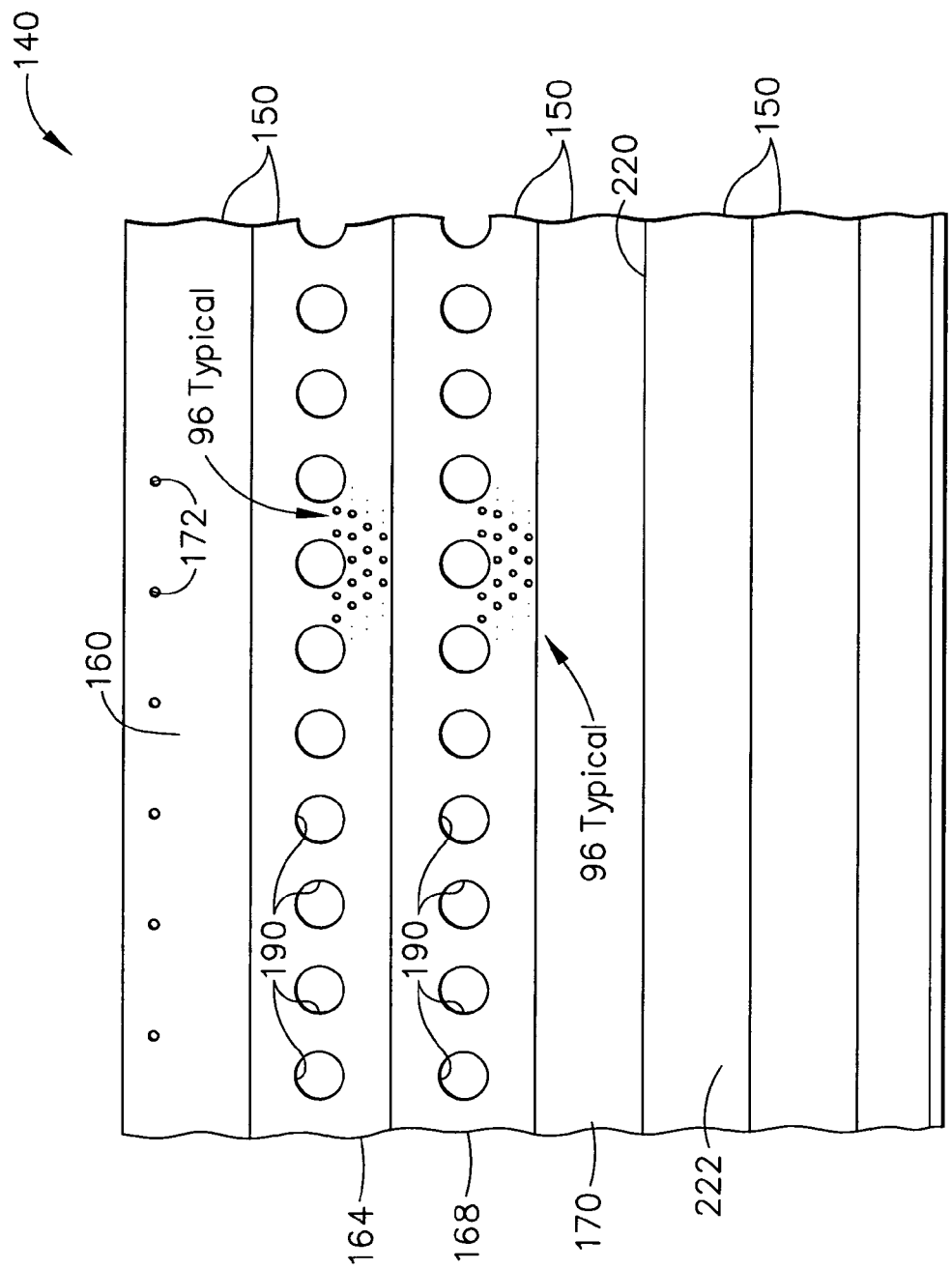
FIG. 5 is an enlarged plan view of the combustor liner shown in FIG. 4.

Liner multinugget region 46 includes a plurality of nuggets 92. In the exemplary embodiment, region 46 includes three nuggets 92. Liner multihole region 48 includes a plurality of openings 96 (representative openings 96 shown). Other regions of the liner may include multihole type openings 96, such as depicted in FIGS. 2, 4, and 5.

A layer 110 of thermal barrier material is applied on combustor liner surface 80. Thermal barrier material further insulates combustor liner surface 80 from high temperature combustion gases. In an exemplary embodiment, thermal barrier coating material is commercially available from Englehart Industries, Wilmington Mass.

During operation, as atomized fuel is injecting into combustion zone 36 and ignited, heat is generated within zone 36. Although air enters combustion zone 36 through cooling features 88 and forms a thin protective boundary of air along combustor liner surface 80, a variation in exposure of combustor liner surfaces to high temperatures may induce thermal stresses into panels 50. As a result of continued exposure to thermal stresses, over time, panels 50 may become deteriorated.

Deteriorated regions of combustor liner 40 may be removed and replaced using the methods described herein. More specifically, deteriorated regions of either liner multinugget region 46 and/or liner multihole region 48 may be removed and replaced using the methods described herein.

If a field returned engine, such as engine 10, indicates that combustor liner multinugget region 46 includes at least one deteriorated panel 50, a circumferential cut is made through combustor liner 40 to remove deteriorated panels 50. More specifically, as shown in FIG. 3, the cut is made radially through liner 40 and through a panel body 104, as illustrated with line 120, such that the cut extends from liner exterior surface 82 to liner interior surface 80, and such that a portion 122 of panel body 104 of panel 50 being cut remains secured within combustor 30. Furthermore, the cut is extended through liner 40 downstream from deteriorated panels 50 being replaced. Fasteners 74 may be loosened to separate deteriorated panels 50 from liner 40 for removal. Alternatively, a second cut may then be made upstream from deteriorated panels 50 being replaced, such that deteriorated panels 50 are separated and removable from combustor liner 40 to create an opening or missing portion (deficit) in the liner.

Figure 6:
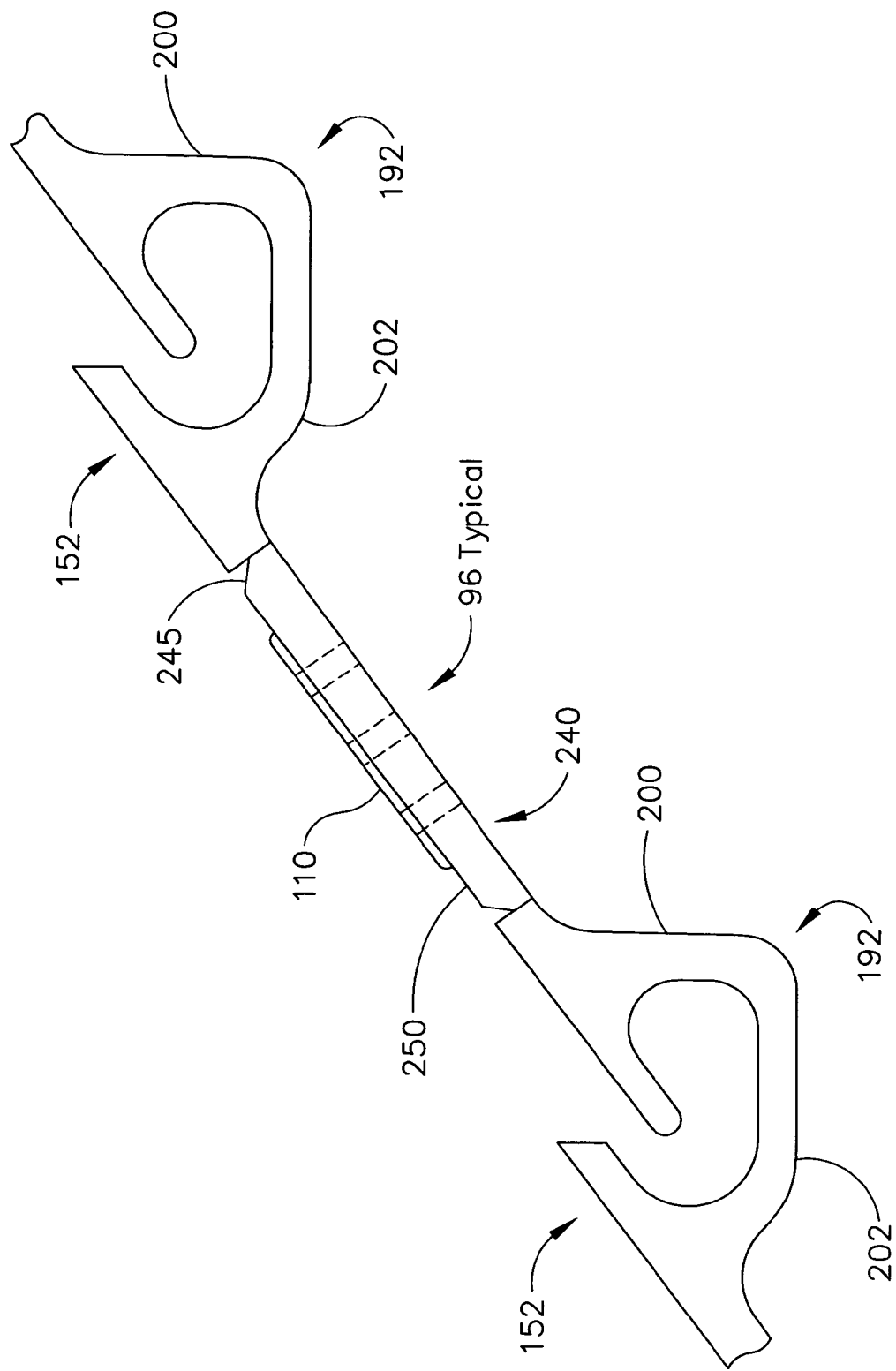
FIG. 6 is an enlarged partial cross-sectional view of the combustor liner shown in FIG. 4.
Figure 7:
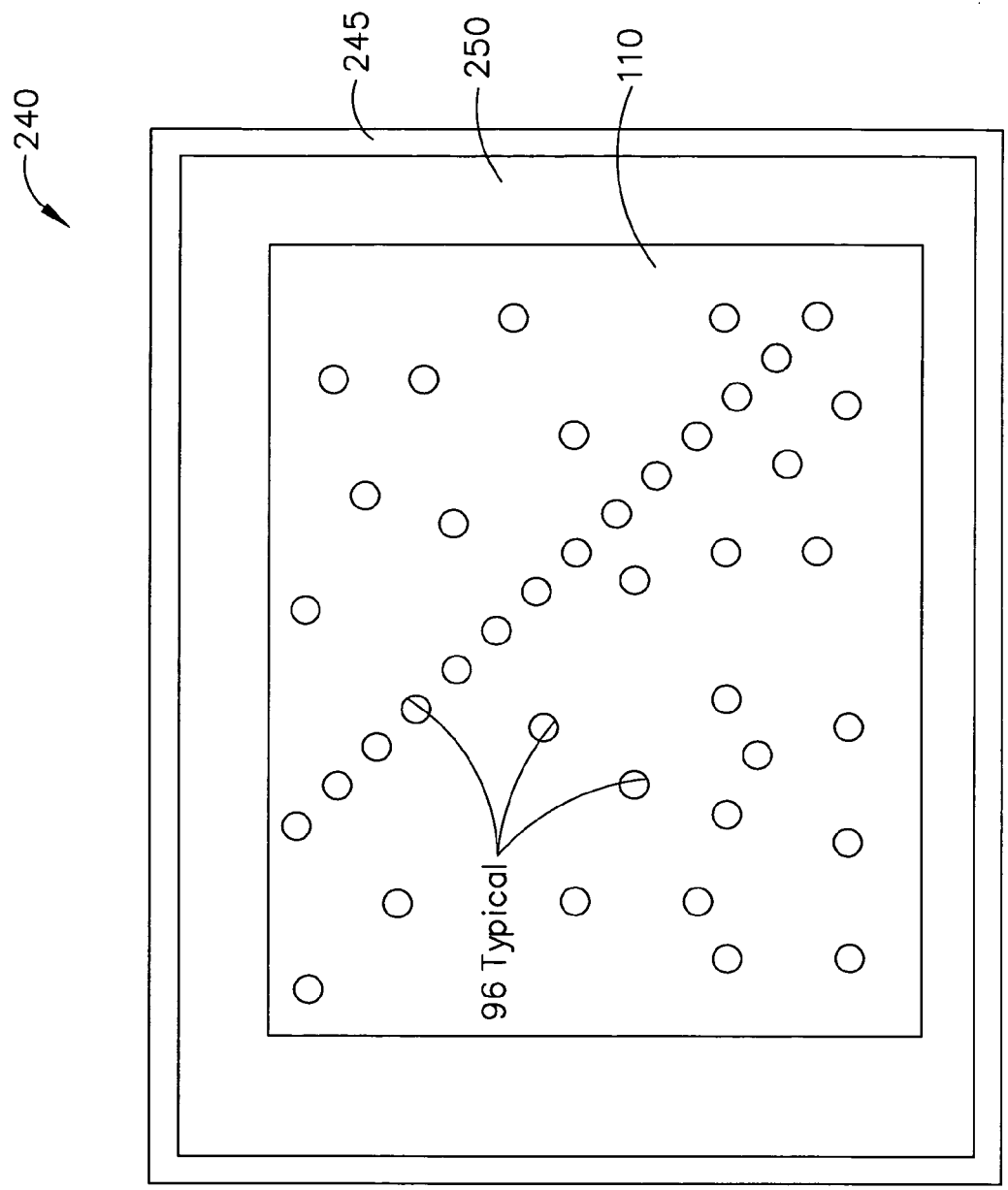
FIG. 7 is a plan view of a replacement panel.

Repairs to a combustor liner made as described above may result in replacement of a complete annular segment of the liner with a comparable or compatible annular liner segment. Accordingly, replacement panels for this type of combustor liner repair would have the size, shape, and geometry depicted for the original liners themselves in the accompanying Figures. Alternatively, repairs may be made with a partial annular segment or with discrete patches made with replacement panels which are shaped to correspond to a removed segment of the combustor liner, such as replacement panel 240 depicted in FIGS. 6 and 7.

After deteriorated panels 50 are removed from combustor liners 40, replacement panels may be installed into combustor liners 42 and/or 44. If required, the replacement panels are formed to include a nugget configuration that is substantially identical to that portion of liner 40 being replaced. In one embodiment, at least one of a forging, roll welded ring, or a casting is used as a replacement panel.

Replacement panels may be formed from a planar or substantially planer sheet of material which is then formed to the required shape to conform to the deficit in the liner being replaced. This may include forming the sheet of material into a cylindrical, semi-cylindrical, spherical, semi-spherical, or any required shape. Openings are formed into the material as required to meet the requirements of the deficit or removed portion of the combustor liner, and may include holes of various patterns and sizes. In plan view, the panels may be square, rectangular, or any other shape suitable for use in replacing the applicable deficit in the combustor liner.

The replacement panel is then welded into combustor liner 42 and/or 44, such that the replacement panel is welded to an existing panel 50 that remains secured within combustor liner 42 and/or 44. More specifically, a downstream side (not shown) of a body of the replacement panel is welded to panel body portion 122 within combustor 30. In one embodiment, electron beam, EB, welding is used to secure the replacement panel within combustor 30. In another embodiment, tungsten inert gas, TIG, welding is used to secure the replacement panel within combustor 30. Thermal barrier coating material may then be applied on the peripheral edge of replacement panel and combustor liner surface 80 in the vicinity of the welding or other securement, and a protective mask may be placed over the openings 96 to maintain their quality checked condition. Fastener 74 is then re-tightened.

If a field returned engine, such as engine 10, indicates that combustor liner multihole region 48 includes at least one deteriorated panel 50, a cut is made through combustor liner 40 to remove deteriorated panels 50. More specifically, as shown in FIG. 3, the circumferential cut is made radially through liner 40 and through a panel body 104, as illustrated with line 120, such that the cut extends from liner exterior surface 82 to liner surface 80, and such that panel body portion 122 remains secured within combustor 30. Furthermore, the cut is extended through liner 40 downstream from deteriorated panels 50 being replaced. A second cut may then be made within multihole region 48 and upstream from deteriorated panels 50 being replaced, such that a deteriorated portion of multihole region 48 is separated and removable from combustor liner 40 to create an opening or missing portion (deficit) in the liner. Fasteners 74 may then be loosened to separate the deteriorated portion and multinugget region 46 from liner 40 for removal as required.

Repairs to a combustor liner made as described above may result in replacement of a complete annular segment of the liner with a comparable or compatible annular liner segment. Accordingly, replacement panels for this type of combustor liner repair would have the size, shape, and geometry depicted for the original liners themselves in the accompanying Figures. Alternatively, repairs may be made with a partial annular segment or with discrete patches made with replacement panels which are shaped to correspond to a removed segment of the combustor liner, such as replacement panel 240 depicted in FIGS. 6 and 7.

After deteriorated portions of multihole region 48 are removed from combustor 30, a replacement panel may be installed into combustor 30. In one embodiment, at least one of a forging, roll welded ring, a casting, or a sheet metal panel is manufactured and used as a replacement panel. The multihole region openings 96 are pre-formed in the replacement panel before the replacement panel is attached. Thermal barrier coating 110 is also applied as required, including in the vicinity of openings 96 so as to cover edges of the openings 96 and surrounding surfaces of the replacement panel. In one embodiment, the openings are formed with a laser process. In another embodiment, the openings are formed using an electron discharge machining, EDM, process. In yet another embodiment, the newly formed openings may be sized differently, reduced, or re-positioned, to facilitate improving cooling of combustor 30.

Replacement panels may be formed from a planar or substantially planer sheet of material which is then formed to the required shape to conform to the deficit in the liner being replaced. This may include forming the sheet of material into a cylindrical, semi-cylindrical, spherical, semi-spherical, or any required shape. Openings are formed into the material as required to meet the requirements of the deficit or removed portion of the combustor liner, and may include holes of various patterns and sizes. In plan view, the panels may be square, rectangular, or any other shape suitable for use in replacing the applicable deficit in the combustor liner.

Replacement panels may be sized and shaped to fit a particular portion removed from liner 140, or may be pre-fabricated in one or more commonly used sizes and shapes. Replacement panels may include one or more openings 96 extending therethrough and a thermal barrier material 110 applied to at least one surface. Thermal barrier material 110 may be applied to both surfaces, and may be applied so as to cover edges of one or more openings 96. However, to facilitate securement to the liner 140, replacement panels (referencing replacement panel 240 illustrated in FIGS. 6 and 7) have a peripheral edge 250 which is at least partially, and which may be substantially or fully, free of thermal barrier material 110. Replacement panel 240 may also include a beveled or chamfered edge 245 to facilitate welding or other securement processes.

Forming the multihole region openings 96 in the replacement panel and applying thermal barrier material 110 before installation permits the replacement panel to be quality checked, including checking and verifying the airflow properties of openings 96, under controlled factory conditions. The peripheral portion of the replacement panel remains substantially free of thermal barrier material to facilitate securing the replacement panel.

The replacement panel is then welded to an existing panel 50 that remains secured within combustor 30. More specifically, a downstream side (not shown) of a body of the replacement panel is welded to panel body portion 122 within combustor 30. In one embodiment, electron beam, EB, welding is used to secure the replacement panel within combustor 30. In another embodiment, tungsten inert gas, TIG, welding is used to secure the replacement panel within combustor 30. Thermal barrier coating material may then be applied on the peripheral edge of replacement panel 240 and combustor liner surface 80 in the vicinity of the welding or other securement, and a protective mask may be placed over the openings 96 to maintain their quality checked condition.

Because deteriorated liners are replaced using the method described herein, combustors 30 are returned to service using a replacement process that facilitates improved savings in comparison to removing and replacing entire combustor liners 40. Furthermore, because the replacement panels are formed to be substantially identical to originally installed panels 50, aerodynamic performance and combustor performance are not adversely impacted by the replacement panels.

FIG. 4 is an enlarged cross-sectional view of an alternative embodiment of an inner combustor liner 140 that may be used with gas turbine engine 10 (shown in FIG. 1). FIG. 5 is an enlarged plan view of combustor liner 140. Liner 140 is substantially similar to liners 40 (shown in FIGS. 2 and 3), and is installed within a combustor (not shown). The combustor includes a combustor liner that includes annular inner liner 140 and an annular outer liner (not shown) that is formed substantially similarly to inner liner 140. Inner liner 140 includes a plurality of panels 150 which include a series of steps 152, each of which form a distinct portion of combustor liner 140.

Panels 150 are connected serially. Inner liner 140 includes a bolt band 160 and a first panel 164. Inner bolt band 160 is coupled to a dome assembly (not shown) and extends downstream from the dome assembly to first panels 164. First panel 164 and panels 150 are connected downstream from bolt band 160, such that each adjacent downstream panel 150 is numbered sequentially. Accordingly, a second panel 168 is connected downstream from first panel 164, and a third panel 170 is connected downstream from second panel 168. Bolt band 160 includes a plurality of openings 172 sized to receive fasteners 74 (shown in FIG. 2) for securing liner 140 to the dome assembly.

Each combustor panel 150 includes a combustor liner surface 180, an exterior surface 182, and an overhang portion 184. Combustor liner surface 180 extends from the dome assembly to the turbine nozzle. Combustor liner surface 180 and exterior surface 182 are connected together at overhang portion 184 and form a rear facing edge 186. A plurality of air cooling features 188 separate adjacent combustor panels 150.

Air cooling features 188 include a plurality of openings 190 which receive air therethrough from an air plenum (not shown) such that a thin protective boundary of air is formed between high temperature combustion gases and combustor liner surface 180. Openings 190 are known as dilution openings and extend between liner surface 180 and exterior surface 182 to facilitate mixing of combustion gases within the combustor. In the exemplary embodiment, openings 190 are substantially circular. Specifically, each panel 150 includes an upstream end 200, a downstream end 202, and a body 204 extending therebetween. Panels 150 are connected, such that each panel downstream end 202 is connected to an upstream end 200 of an adjacent downstream panel 150. Nuggets 192 are formed between adjacent connected panels respective downstream and upstream ends 202 and 200. Nuggets 192 are known as super slot nuggets. In the exemplary embodiment, liner 140 includes six nuggets 192. Regions of the liner may include multihole type openings 96, such as depicted in FIGS. 4 and 5.

In an alternative embodiment, a layer of thermal barrier material (not shown) is applied on combustor liner surface 180, and enhances the thermal protection of combustor liner surface 180 from high temperature combustion gases.

Deteriorated regions of combustor liner 140 may be removed and replaced using the methods described herein. If a field returned engine, such as engine 10, indicates that combustor liner 140 includes at least one deteriorated panel 150, a cut is made circumferentially through combustor liner 140 to remove deteriorated panels 150. More specifically, as shown in FIG. 4, the circumferential cut is made radially through liner 140 and through a nugget 192, as illustrated with line 220, such that the cut extends from liner exterior surface 182 to liner surface 180. In one embodiment, the cut is made between third panel 170 and a fourth panel 222. Furthermore, the cut is extended through liner 140 downstream from deteriorated panels 50 being replaced.

Repairs to a combustor liner made as described above may result in replacement of a complete annular segment of the liner with a comparable or compatible annular liner segment. Accordingly, replacement panels for this type of combustor liner repair would have the size, shape, and geometry depicted for the original liners themselves in the accompanying Figures. Alternatively, repairs may be made with a partial annular segment or with discrete patches made with replacement panels which are shaped to correspond to a removed segment of the combustor liner, such as replacement panel 240 depicted in FIGS. 6 and 7.

The portion removed from the combustor liner 140 may be partially or fully surrounded by remaining portions of the combustor liner 140. Accordingly, the removed portion may form an aperture in the liner or any other size or shape of deficit in the liner.

After deteriorated portions of liner 140 are removed from the combustor, a replacement panel 240 may be installed into combustor liner 140. In one embodiment, at least one of a forging, roll welded ring, a casting, or a sheet metal panel is manufactured and used as a replacement panel.

Replacement panels may be formed from a planar or substantially planer sheet of material which is then formed to the required shape to conform to the deficit in the liner being replaced. This may include forming the sheet of material into a cylindrical, semi-cylindrical, spherical, semi-spherical, or any required shape. Openings are formed into the material as required to meet the requirements of the deficit or removed portion of the combustor liner, and may include holes of various patterns and sizes. In plan view, the panels may be square, rectangular, or any other shape suitable for use in replacing the applicable deficit in the combustor liner.

Replacement panel 240 may be sized and shaped to fit a particular portion removed from liner 140, or may be prefabricated in one or more commonly used sizes and shapes. Replacement panel 240 may include one or more openings 96 extending therethrough and a thermal barrier material 210 applied to at least one surface. Thermal barrier material 210 may be applied to both surfaces, and may be applied so as to cover edges of one or more openings 96. However, to facilitate securement to the liner 140, replacement panel 240 has a peripheral edge 250 which is at least partially, and which may be fully, free of thermal barrier material 110. Replacement panel 240 may also include a beveled or chamfered edge 245 to facilitate welding or other securement processes.

Replacement panel 240 may be inspected and tested, such as "flow checking" openings 190 for specified airflow properties, prior to installation because the configuration of openings 190 is not altered after installation, such as by application of additional thermal barrier material adjacent to or upon edges of one or more openings.

The replacement panel is then welded into combustor liner 140, such that the replacement panel is secured within the combustor. More specifically, a downstream end (not shown) of the replacement panel is welded to an existing panel 150 such that a nugget 192 is formed between the replacement panel and panel 150. In one embodiment, electron beam, EB, welding is used to secure the replacement panel within combustor liner 140. In another embodiment, tungsten inert gas, TIG, welding is used to secure the replacement panel within combustor liner 140. Thermal barrier material may then be applied on remaining panel combustor liner surface 180.

The above-described combustor liner replacement method is cost-effective and highly reliable. The method includes the steps of removing deteriorated panels from the combustor liner, such that deteriorated panels may be replaced with replacement panels. In one embodiment, deteriorated panels are removed by cutting through the body of the panel, and replacement panels are then welded to into the combustor liner. As a result, a method is provided which enables deteriorated combustor liner panels to be removed and replaced in a cost-effective and reliable manner.

While the invention has been described in terms of various specific embodiments, those skilled in the art will recognize that the invention can be practiced with modification within the spirit and scope of the claims.

What is claimed is:

1. A method for repairing a combustor liner for a gas turbine engine combustor, the combustor having a combustion zone formed by inner and outer liners, said method comprising the steps of:
   removing a portion of a combustor liner to form a deficit in said liner;
   providing a replacement panel having two opposed surfaces bounded by a peripheral edge, the replacement panel having at least one opening;
   applying a thermal barrier material on at least one of the surfaces adjacent to said at least one opening, such that a peripheral portion of the at least one surface and said peripheral edge are free of said thermal barrier material; and
   installing said replacement panel in said deficit.

2. A method in accordance with claim 1, further comprising the step of applying thermal barrier material to said peripheral portion after installing said replacement panel in said deficit.

3. A method in accordance with claim 2, further comprising the step of applying a protective mask to said replacement panel over said at least one opening prior to said step of applying thermal barrier material.

4. A method in accordance with claim 1, wherein said step of installing said replacement panel further comprises the step of welding said replacement panel within said deficit.

5. A method in accordance with claim 4, wherein said step of welding further comprises the step of using at least one of an EB welding process and a TIG welding process to secure said replacement panel within said deficit.

6. A method in accordance with claim 1, further comprising the step of selecting a replacement panel suitably sized for said deficit.

* * * * *